United States Patent
Graf et al.

(10) Patent No.: US 10,119,727 B2
(45) Date of Patent: Nov. 6, 2018

(54) MECHANICAL RELAY AND SOLID-STATE RELAY FOR CONTROLLING HEATING ELEMENTS

(71) Applicant: Infineon Technologies AG, Neubiberg (DE)

(72) Inventors: Alfons Graf, Kaufering (DE); Thomas Klug, Augsburg (DE)

(73) Assignee: Infineon Technologies AG, Neubiberg (DE)

( * ) Notice: Subject to any disclaimer, the term of this patent is extended or adjusted under 35 U.S.C. 154(b) by 718 days.

(21) Appl. No.: 14/705,376

(22) Filed: May 6, 2015

(65) Prior Publication Data

US 2016/0325602 A1  Nov. 10, 2016

(51) Int. Cl.
| | |
|---|---|
| *H05B 1/02* | (2006.01) |
| *F24H 9/20* | (2006.01) |
| *H02H 3/20* | (2006.01) |
| *H02H 7/22* | (2006.01) |

(52) U.S. Cl.
CPC ....... *F24H 9/2071* (2013.01); *F24H 2250/04* (2013.01); *H02H 3/202* (2013.01); *H02H 7/222* (2013.01)

(58) Field of Classification Search
CPC ... F24H 9/2071; F24H 2250/04; H02H 3/202; H02H 7/222; H05B 1/02; H05B 1/0236; H05B 1/0238; H05B 3/0042
USPC ................ 219/202, 203, 483–486, 501, 519
See application file for complete search history.

(56) References Cited

U.S. PATENT DOCUMENTS

| | | | | |
|---|---|---|---|---|
| 4,540,875 A | * | 9/1985 | Buttolph, III | G05D 23/1921 219/486 |
| 5,006,695 A | * | 4/1991 | Elliott | G05D 23/1913 219/494 |
| 5,359,178 A | * | 10/1994 | Kotani | G03G 15/2003 219/481 |
| 5,784,531 A | * | 7/1998 | Mann | F24H 9/2028 219/486 |
| 6,654,572 B2 | * | 11/2003 | Kataoka | G03G 15/2039 219/216 |
| 7,932,480 B2 | * | 4/2011 | Gu | H05B 1/0244 219/482 |
| 8,237,094 B2 | * | 8/2012 | Menassa | H05B 1/0275 219/483 |
| 9,829,202 B2 | * | 11/2017 | Yang | F24D 13/02 |
| 2004/0159652 A1 | * | 8/2004 | Harrington | G05D 23/1951 219/486 |
| 2012/0328270 A1 | * | 12/2012 | Dykman | F24H 3/022 392/360 |

OTHER PUBLICATIONS

Graf, A. et al., "Die Zukunft des Kfz-Bordnetzes," retrieved from http://www.elektroniknet.de/automotive/sonstiges/artikel/29277/1/, 8 pp., published on Sep. 6, 2010.

* cited by examiner

*Primary Examiner* — Mark Paschall
(74) *Attorney, Agent, or Firm* — Shumaker & Sieffert, P.A.

(57) ABSTRACT

A circuit comprises a mechanical relay and a solid-state relay. The mechanical relay is configured to switch a first supply current of the first heating element on a first supply line. The solid-state relay is configured to switch a second supply current of a second heating element on a second supply line.

20 Claims, 5 Drawing Sheets

MECHANICAL RELAY AND SOLID-STATE RELAY FOR CONTROLLING HEATING ELEMENTS

TECHNICAL FIELD

This disclosure relates to circuits and techniques for controlling heating elements.

BACKGROUND

In various applications, heating elements such as positive-temperature-coefficient (PTC) heating elements or resistive wire heating elements are employed. E.g., in automotive applications heating elements are used to provide fast and convenient heating of a vehicle interior.

Typically, a plurality of PTC heating elements are controlled independently by respective mechanical relays. E.g., if a higher (lower) heating power is required, a larger (smaller) number of mechanical relays are operated in a closed position to provide supply currents to the respective heating elements. Here, a granularity of adjustment of the total heating power is typically comparably low; i.e., a number of heating levels which may be implemented may be small. If, e.g., three PTC heating elements are employed either in on or off state, then four heating levels are available.

Sometimes, it may be required to provide a finer granularity of adjustment of the total heating power; i.e., sometimes it may be desirable to increase the number of heating levels.

SUMMARY

Therefore, a need exists for advanced techniques of controlling supply currents of heating elements. In particular, a need exists for techniques which enable controlling the supply currents of heating elements by providing a large number of heating levels in a cost-efficient manner. In particular, a need exists for techniques which enable controlling supply currents of heating elements by providing a larger number of heating levels where corresponding circuitry does not require large space; i.e., space-saving implementation is required.

This need is met by the features of the independent claims. The dependent claims define additional features that may help to meet these or other goals.

According to an aspect, a circuit is provided. The circuit comprises a mechanical relay and a solid-state relay. The mechanical relay is configured to switch a first supply current of a first heating element on a first supply line. The solid-state relay is configured to switch a second supply current of a second heating element on a second supply line.

By employing the combination of the mechanical relay and the solid-state relay, it may be possible to implement a large number of heating levels, e.g., by quickly switching on and of the solid-state relay (SSR) according to a set heating power. E.g., operation of the SSR may be controlled by a pulse-width modulated (PWM) control signal. At the same time, as the functionality of the SSR is complemented by employing a conventional low-cost mechanical relay typically capable of providing a comparably large baseline heating power, the complexity and costs of the circuit may be comparably limited.

According to a further aspect, a system is provided. The system comprises a mechanical relay and a solid-state relay. The mechanical relay is configured to switch a first supply current of a first heating element on a first supply line. The solid-state relay is configured to switch a second supply current of a second heating element on a second supply line. The system further comprises the first heating element and the second heating element.

According to a further aspect, a method is provided. The method comprises sending a first control signal to a mechanical relay; and sending a second control signal to a solid-state relay. The first control signal prompts the mechanical relay to either switch on or switch off a first supply current of a first heating element. The second control signal prompts the solid-state relay to alternately switch on and off a second supply current of a second heating element.

It is to be understood that the features mentioned above and features yet to be explained below can be used not only in the respective combinations indicated, but also in other combinations or in isolation, without departing from the scope of the present invention. Features of the abovementioned aspects and examples may be combined with each other in other examples.

BRIEF DESCRIPTION OF THE DRAWINGS

The foregoing and additional features and effects of the invention will become apparent from the following detailed description when read in conjunction with the accompanying drawings, in which like reference numerals refer to like elements.

DETAILED DESCRIPTION

Figure 1:
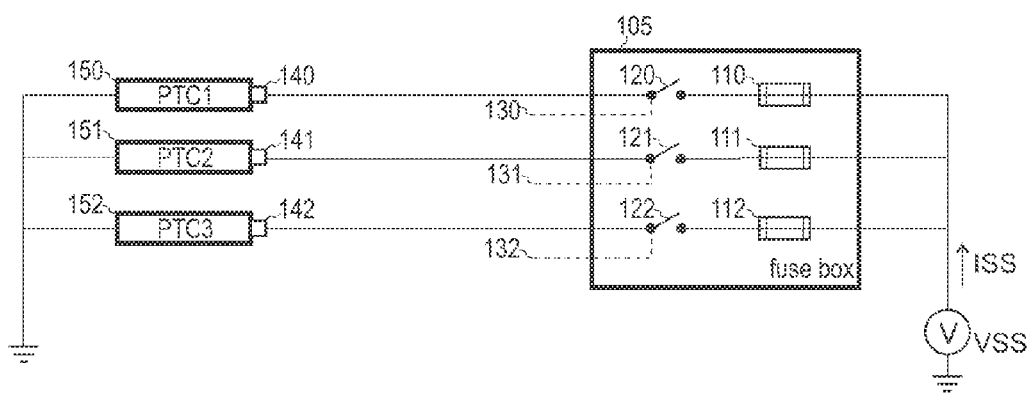
FIG. 1 is a circuit diagram of a system according to reference implementations, wherein the system comprises three mechanical relays and no SSR to switch supply currents of three PTC heating elements.

Various examples described herein relate to a circuit comprising a mechanical relay and a solid-state relay. In particular, various examples relate to controlling supply current of a plurality of heating elements. Various examples described herein relate to a system comprising a mechanical relay, a solid-state relay, and first and second heating elements.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of switching supply currents of heating elements are illustrated. While generally different kinds and types of heating elements may be employed, hereinafter, for illustrative purposes, reference is primarily made to PTC heating elements. Other kinds of heating elements that may be employed are resistive heating elements. By switching the supply currents of the PTC heating elements, it becomes possible to adjust a total heating power provided by the PTC heating elements.

The techniques explained hereinafter rely on employing a combination of one or more conventional mechanical relays and one or more SSRs. E.g., the mechanical relay may be referred to as an electrically operated switch that employs an electromagnet to mechanically operate the switch between a closed position and an open position. E.g., a stray magnetic field of the electromagnet may move a conductor between the open position where a corresponding supply line is interrupted such that a corresponding supply current cannot flow and the closed position where the corresponding supply line is not interrupted such that the corresponding supply current can flow. Implementing the switch functionality by the mechanical relay has the advantage of low manufacturing costs. At the same time, a switching speed of the mechanical relay may be comparably limited. E.g., it may not be possible or only possible to a limited degree to operate the mechanical relay in a PWM mode. E.g., the PWM mode may require switching times having frequencies of more than 1 Hertz.

Differently, it may be possible to operate the SSR in the PWM mode; this is because typically the SSR may support switching times having frequencies of more than 1 Hertz. When operating in the PWM mode, a PWM control signal may be provided to the SSR which causes the SSR to alternately switch on and off the corresponding supply current depending on, e.g., a pulse width of the PWM control signal. The SSR may be an electrically operated switch that relies on electronic switching of the supply current. E.g., the SSR may comprise a semiconductor device to switch on and off the supply current on the corresponding supply line. A depletion layer where free charge carriers are selectively available depending on a gate voltage may be employed. E.g., the semiconductor device may comprise a transistor such as a field-effect transistor or a metal-oxide semiconductor field-effect transistor (MOSFET). It is possible that the semiconductor device comprises a thyristor.

Such techniques as mentioned above are explained in greater detail hereinafter. First, with reference to FIG. 1, a reference implementation is illustrated. In FIG. 1, a current source or voltage source provides a supply current (labelled ISS in FIG. 1). The supply current is fed via respective connectors 140, 141, 142 to PTC heating elements 150, 151, 152. The heating elements 150, 151, 152 can be individually activated by means of mechanical relays 120, 121, 122 arranged within a fuse box 105; the mechanical relays 120, 121, 122 may be so-called plug-in relays. In this sense, the fuse box 105 may act as a socket for the plug-in relays 120, 121, 122.

Overcurrent protection is provided by fuses 110, 111, 112 also arranged in the fuse box 105. Control of the mechanical relays 120, 121, 122 is achieved by respective control interfaces 130, 131, 132 connected to a control device (not shown in FIG. 1). By individually controlling the supply currents of the heating elements 150, 151, 152 via the mechanical relays 120, 121, 122, in total four different heating levels may be implemented. In particular, in the scenario FIG. 1, the total heating power may not be continuously adjusted. Rather, the heating power may only be adjusted in a step-wise manner in between the four different heating levels.

Figure 2:
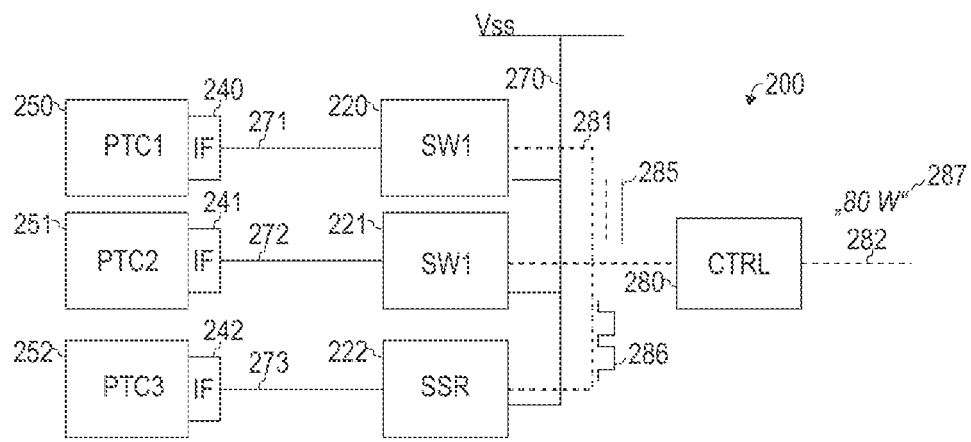
FIG. 2 schematically illustrates a system according to various examples, wherein the system comprises two mechanical relays and one SSR used to switch supply currents of three PTC heating elements.

FIG. 2 is a schematic representation of a system 200 according to various examples. E.g., the system 200 may be employed for heating of an interior of a vehicle. As such, the system 200 may be arranged in a ventilation apparatus of the vehicle and/or may be distributed in the vehicle. E.g., the heating elements 250-252 may be arranged inside the ventilation appatatus, the SSR 222 inside or outside the ventilation apparatus and a fuse box (not shown in FIG. 2) may be arranged in the car body or engine compartment.

The system 200 comprises a circuit including two mechanical relays 221, 222. The mechanical relays 220, 221 are configured to switch respective supply currents of PTC heating elements 250, 251 on respective supply lines 271, 272. Likewise, a SSR 222 of the circuit of the system is configured to switch a respective supply current of a PTC heating element 252 on a respective supply line 273. The mechanical relays 220, 221 and the SSR 222 are coupled in parallel with respect to an input supply line 270. Generally, it is possible that the SSR 222 is flexibly positioned with respect to the mechanical relays 220, 221 and the PTC heating elements 250, 251, 252. In FIG. 2, only high-side supply lines 270, 271, 272, 273 are depicted.

The system 200 comprises connectors 240, 241, 242 that are configured to establish an electrical coupling between the supply lines 271, 272, 273 and the heating elements 250, 251, 252. E.g., the connectors 240, 241, 242 may be implemented as male or female connectors, as plugs and/or sockets. The connectors 240, 241, 242 forward the supply currents to the PTC heating elements 250, 251, 252.

The operation of the mechanical relays 220, 221 is controlled by control signals 285 provided to the mechanical relays 220, 222 via a control interface 281. The operation of the SSR 222 is controlled by a control signal 286 provided to the SSR 222 via the control interface 281. E.g., the control interface 281 may comprise dedicated wiring for each of the mechanical relays 220 221 and the SSR 222, respectively. E.g., the control signal 286 provided to the SSR 222 can be a PWM signal. Here, the SSR 222 may alternately switch on and off the respective supply current of the PTC heating element 252 on the supply line 273 depending on the control signal 286, e.g., depending on a pulse width of the PWM signal. The control signals 285 provided to the mechanical relays 220, 221 may be a logic signal of fixed amplitude which causes the mechanical relays 220, 221 to switch either on or off.

Thus, generally, while for a fixed set heating power the PWM control signal 286 may lead to alternatingly switching on and off the supply current of the PTC heating element 252 on the supply line 273, the control signals 285 may lead to either switching on or switching off the supply currents of the PTC heating elements 250, 251 on the supply lines 271, 272, respectively.

In the scenario of FIG. 2, the control signals 285, 286 are established by a control device 280 of the system 200. In particular, the control device 280 establishes the control signals 285, 286 depending on an input signal 287 received via an input interface 282. The input signal 287 indicates a set heating power. Generally, the input signal 287 may be a logic signal, e.g., a clocked logic signal. E.g., a higher amplitude (lower amplitude) of the input signal 287 may correspond to a higher (lower) indicated set heating power. It is also possible that the input signal is a packetized encoded signal indicating the set heating power. E.g., the input interface 282 may operate according to at least one of the following: controller area network (CAN) protocol, media oriented system (MOST) protocol, local interconnect network (LIN) protocol. In such a scenario, it is possible that the control device 280 comprises a processor which is configured to receive the input signal 287 via the input interface 282 and is further configured to process the input signal 287. E.g., in such a scenario the processor may be configured to execute a digital-to-analog conversion.

Figure 3:
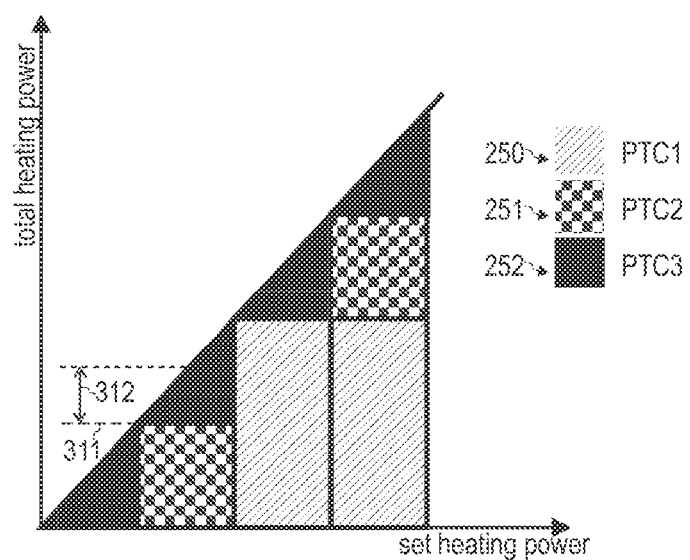
FIG. 3 schematically illustrates the continuous adjustment of the total heating power of the three PTC heating elements.

By such techniques it is possible to continuously adapt the total heating power of the PTC heating elements 250-252. This is illustrated in FIG. 3. In FIG. 3, the total heating power is plotted for different set heating powers. The total heating power builds up from the heating powers of the individual PTC heating elements 250-252 (in FIG. 3, the heating power of the PTC heating element 250 is illustrated by the dashed filling; the heating power of the PTC heating element 251 is illustrated by the checkerboard filling; the heating power of the PTC heating element 252 is illustrated by the black filling). As can be seen from FIG. 3, the heating powers of the PTC heating elements 250, 251 controlled by the mechanical relays 220, 221 are varied in a stepwise manner between zero heating and maximum heating; as such, the heating powers of the PTC heating elements 250, 251 provide a baseline for the total heating power. Differently, the heating power of the PTC heating element 252 is varied in a continuous manner in between minimum heating power and maximum heating power; e.g., the continuously variable heating power of the PTC heating element 253 controlled by the SSR 222, in combination by the baseline heating power of the PTC heating elements 250, 251 controlled by the mechanical relays 220, 221, can yield the continuously adjustable total heating power.

E.g., it is possible that the control signals 285 provided to the mechanical relays 220, 221 are established depending on a threshold comparison between the set heating power and a predefined threshold 311. E.g., if the set heating power exceeds the predefined threshold 311, the supply current of the corresponding PTC heating element 250, 251 is either switched on or off; in this regard, the control signals 285 prompt the mechanical relays 250, 251 to either switch on or switch off the respective supply currents on the supply lines 271, 272. Differently, it is possible that the control device 280 is configured to establish the control signal 286 provided to the SSR 222 depending on a difference 312 between the set heating power and the predefined threshold 311. E.g., for larger (smaller) differences 312 between the set heating power and the predefined threshold 311, different pulse widths of the PWM control signal 286 can be implemented; thereby, different frequencies of switching the supply current of the PTC heating element 252 on and off can be implemented. In this regard, the control signal 286 provided to the SSR 222 prompts the SSR 222 to alternately switch on and off the supply current provided to the PTC heating element 252 on the supply line 273. Thereby, the total heating power can be continuously adjusted.

E.g., in the scenario of FIGS. 2 and 3, it is possible that the heating power of the PTC heating element 250 is twice as large as the heating power of the PTC heating element 251 and PTC heating element 253 controlled by the SSR 222; e.g., the maximum heating power of the PTC heating element 250 may amount to 600 W; differently, the heating power of the PTC heating element 251 may amount to 300 W. It is possible that the maximum heating power of the PTC heating element 252 controlled by the SSR 222 amounts to 300 W as well. Thereby, the total heating power may be continuously varied between 0 W and 1200 W. A linear control of the total heating power as a function of the set heating power becomes possible.

In detail, hereinafter, the switching procedure for the supply currents of the different heating elements 250, 251, 252 on the different supply lines 271, 272, 273 is explained for increasing total heating powers. First, starting at zero set heating power, the supply currents of the PTC heating elements 250, 251 are switched off—here, the baseline heating power is zero; at the same time, by varying the pulse width of the PWM control signal 286 controlling the operation of the SSR 222, the heating power of the PTC heating element 252 is linearly and continuously ramped up from 0 W to 300 W. Once the total heating power of 300 W is reached, the PTC heating element 251 is switched on by the mechanical relay 221. I.e., if the set heating power crosses the predefined threshold 311 of 300 W, the PTC heating element 251 is supplied with the supply current on the supply line 272 corresponding to the maximum heating power of the PTC heating element 251. Then, a baseline heating power of 300 W can be implemented. Depending on the difference 312 to the predefined threshold 311 of 300 W, the supply current of the PTC heating element 252 on the supply line 273 is continuously varied to linearly increase the heating power of the PTC heating element 252. Once the total heating power reaches 600 W, the supply current of the PTC heating element 251 on the supply line 272 is switched off; at the same time, the supply current of the PTC heating element 250 on the supply line 271 is switched on so that the PTC heating element 250 operates at a maximum heating power. Hence, a baseline heating power of 600 W can be provided. Again, the supply current of the PTC heating element 252 on the supply line 273 is continuously increased to linearly adjust the heating power of the PTC heating element 252. Once the total heating power reaches 600 W, the supply current of the PTC heating element 251 on the supply line 272 is switched on by appropriately operating the mechanical relay 221. Again, the supply current of the PTC heating element 252 on the supply line 273 is continuously increased to linearly increase the heating power of the PTC heating element 252. Finally, the maximum total heating power of 1200 W is reached.

To achieve a sufficient total heating power, it is possible that the mechanical relays 220, 221, as well as the SSR 222 are configured to switch on and off the supply currents on the supply lines 271, 272, 273 having an amplitude of at least 1 A, preferably of at least 20 A, more preferably more than 40 A; here a voltage level used for driving the heating elements may amount to 14 V or 12 V.

With reference to the following Figs., specific implementations of the circuitry of the system 200 are explained.

Figure 4:
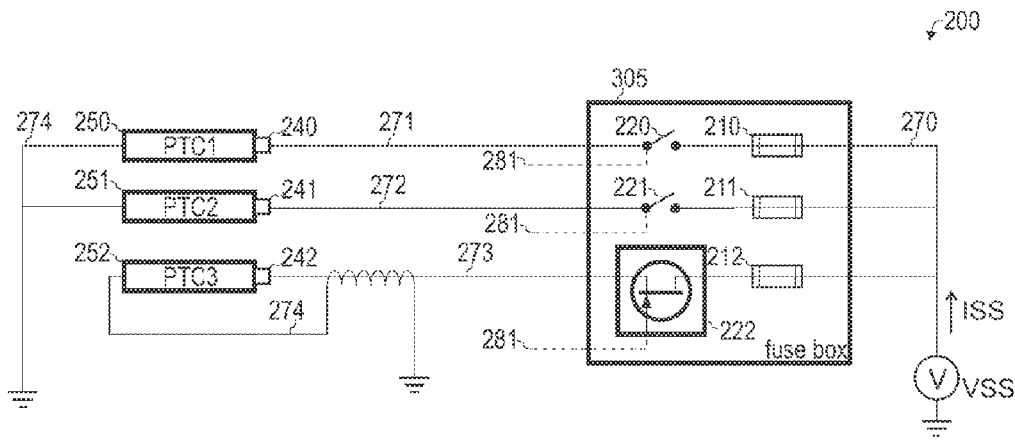
FIG. 4 is a circuit diagram of a system according to various examples, wherein the SSR is positioned within a housing of a fuse box, wherein the two mechanical relays are positioned within the housing of the fuse box.

Turning to FIG. 4, a circuit diagram of the system 200 according to various examples is illustrated. In the scenario of FIG. 4, the SSR 222 is positioned within a housing of the fuse box 305. Inside the housing of the fuse box 305, the mechanical relays 220, 221 are co-located with the SSR 222. Further, inside the fuse box 305 electrical fuses 210, 211, 212 are provided and are electrically coupled in series with the mechanical relays 220, 221 and the SSR 222, respectively, on the supply lines 271-273. Overcurrent protection is achieved by the electrical fuses 210-212. Because of this, it is not required to provision overcurrent protection circuitry as part of the SSR 212.

As can be seen from a comparison of FIGS. 1 and 4, it is possible to provide the SSR 212 while maintaining the overall architecture of the system 200 if compared to the reference implementation of FIG. 1. Here, it may only be required to adapt the control interface 281 and/or the control signal 286 provided via the control interface 281 to the SSR 222 to the specifications of the SSR 222.

To ensure electromagnetic compatibility (EMC), it is possible to twist a low-side of the supply line 274 of the PTC heating element 252 around a high-side of the supply line 273. This may reduce stray electromagnetic fields; such stray electromagnetic fields may otherwise evolve due to the comparably quick variation of the supply current on the supply line 273 alternately switched on and off due to the PWM control signal 286.

Thus, in FIG. 4, a scenario has been shown where, both, the mechanical relays 220, 221, as well as the SSR 222 are positioned inside the housing of the fuse box 305. However, it is also possible that the mechanical relays 220, 221 are arranged inside the housing of the fuse box—while the SSR 222 is arranged outside the housing of the fuse box 305. Such a scenario is illustrated in the circuit diagram of FIG. 5.

Figure 5:
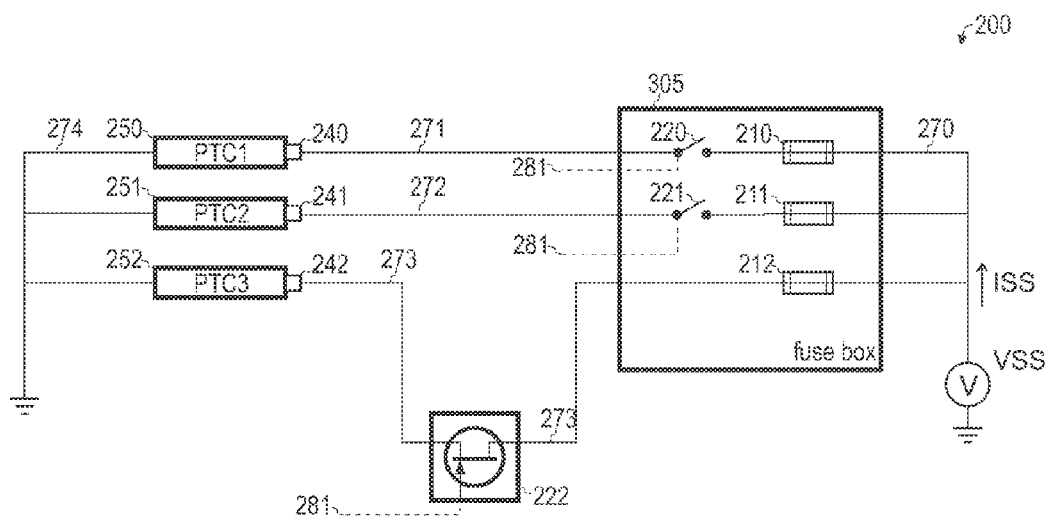
FIG. 5 is a circuit diagram of a system according to various examples, wherein the SSR is positioned outside the housing of the fuse box, wherein the two mechanical relays are positioned within the housing of the fuse box.

In the scenario of FIG. 5, the SSR 222 is provisioned somewhere in-between the fuse box 305 and the PTC heating element 252. Here, it is possible to flexibly rely on appropriate space for positioning the SSR 212. Also in such a scenario, overcurrent protection is achieved by the electrical fuse 212. E.g., it is possible that the SSR 222 is located in a controller unit, e.g., a body controller unit. It may be possible that the controller unit and/or the SSR 222 provides overcurrent protection circuitry for the supply line 273; then the electrical fuse 212 may be dispensable.

Figure 6:
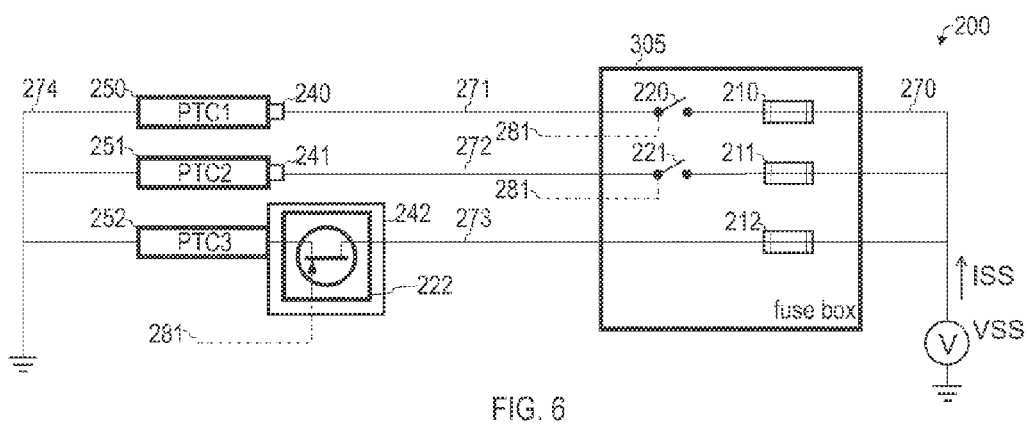
FIG. 6 is a circuit diagram of a system according to various examples, wherein the SSR is positioned within a housing of a connector between a corresponding supply line and the PTC heating element, wherein the 2 mechanical relays are positioned within the housing of the fuse box.

A further scenario is illustrated by the circuit diagram of FIG. 6. In the scenario of FIG. 6, the SSR 222 is integrated in the connector 242. E.g., the connector 242 may comprise an electrical contact, a housing, and an engagement element configured to releasably attach the housing of the connector 242 to the heating element 252 such that the electrical contact of the connector 242 can engage with a counterpart electrical contact of the heating element 252. Here, it is possible that the SSR 222 is arranged within the housing of the connector 242. Such a scenario has the advantage that it is possible to integrate the SSR 222 in the connector 242 without requiring any additional dedicated space for provisioning the SSR 222. E.g., it is possible that a largest outer dimension of the housing of the contact 242 is smaller than 10 cm, preferably smaller than 8 cm, more preferably smaller than 5 cm. Also in the scenario of FIG. 6, overcurrent protection functionality is implemented by the electrical fuse 212 provided in the fuse box 305. It is not required that the SSR 222 comprises overcurrent protection circuitry. This may allow to further reduce the required space for implementing the SSR 222. However, it is possible that the SSR 222 provides overcurrent protection circuitry in addition or instead of the electrical fuse 212.

Figure 7:
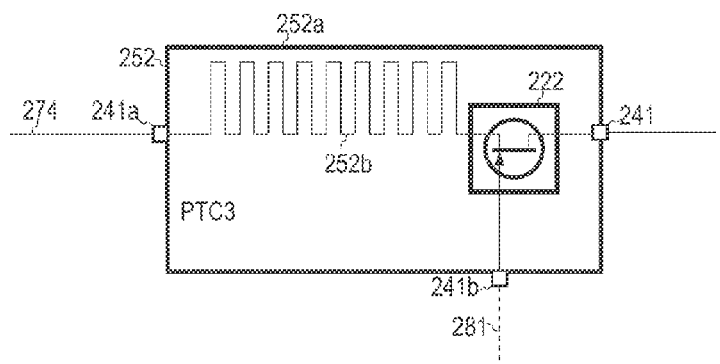
FIG. 7 is a schematic illustration of a PTC heating element, wherein the SSR is positioned within a housing of the PTC heating element.

Now turning to FIG. 7, the PTC heating element 252 according to various examples is illustrated in detail. In the scenario of FIG. 7, the PTC heating element 252 comprises the SSR 222. In particular, the PTC heating element 252 comprises a housing 252a. The SSR 222 is arranged within the housing 252a. Further, the PTC heating element 252 comprises PTC heating wiring 252b which is also arranged within the housing 252a. E.g., it is possible that the housing 252a comprises holes such that air can enter and be heated up in the vicinity of the PTC heating wiring 252b. Further connectors 241b, 241a are provided to provide a coupling to the control interface 281 and the low-side supply line 274, respectively.

Figure 8:
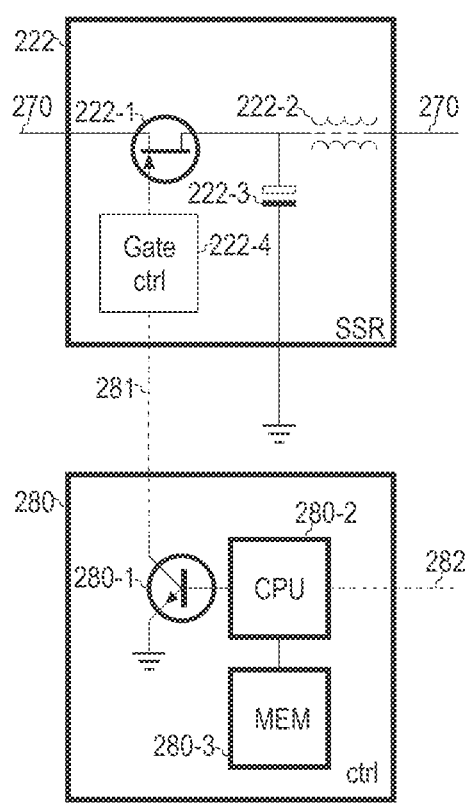
FIG. 8 is a schematic illustration of a control device and the SSR according to various examples.

In FIG. 8, details of the control device 280 and the SSR 222 are shown. In the scenario of FIG. 8, the control device 280 comprises a processor 280-2 and a memory 280-3. Further, the control device 280 comprises a transistor 280-1 which provides the control signal 286. The processor 280-2 receives, via the input interface 282, the input signal indicating the set heating power. Then, the processor 280-2 processes the input signal and controls, based on the processed input signal, the transistor 280-1; for this, the processor 280-2 may retrieve control instructions from the memory 280-3. E.g., execution of the control instructions retrieved from the memory 280-3 may cause the processor 280-2 to decode the input signal which may be encoded based on a protocol such as CAN, MOST, or LIN. E.g., the input interface 282 may operate according to the MOST protocol and include packetized data which digitally encodes the set heating power. By switching on and off the transistor 280-1, the PWM control signal 286 can be provided to the MOSFET 222-1 of the SSR 222. To facilitate control of the MOSFET 222-1, a gate control circuit 222-4 is provided. By means of the gate control circuit 222-4, voltage control or current control of the MOSFET 222-1 is possible. The gate control circuitry 222-4 can the be driven by a voltage level input (voltage control) or a current level input (current control). When operating in current control, control interface 281 may be put to ground by opening the transistor 280-1; this switches on the MOSFET 222-1. The gate control circuit 222-4 may be present in the SSRs 222 as discussed above with respect to FIGS. 4-7.

While in the scenario of FIG. 8 the control device 280 comprises the processor 280-2, generally, it is also possible that the control device 280 does not include a processor. This may be in particular the case where the input signal received via the input interface 282 is a clocked logic signal. E.g., the clocked logic signal may be used directly to control the transistor 280-1, e.g., employing PWM.

Further, as can be seen from FIG. 8, the SSR 222 comprises circuitry 222-2, 222-32 to reduce electromagnetic radiation. In the scenario of FIG. 8, this is achieved by provisioning a low-pass filter by provisioning the inductance 222-2 and the capacitance 222-3. Undesired frequency components may thus be dampened by the filter.

Generally, it is also possible that the SSR 222 comprises overcurrent protection circuitry (not shown in FIG. 8); sometimes, such an SSR including overcurrent protection circuitry is referred to as a protected smart switch. The overcurrent protection circuitry may be provisioned instead of or in addition to the electrical fuse 212 of the supply line 273 shown in FIGS. 4-6. In such a scenario, typically the SSR 222 may be arranged in the fuse box 305 (cf. FIG. 4).

As will be appreciated, above techniques have been illustrated which allow to control heating of a plurality of electrical heating elements in a lean, cost-efficient and space-saving manner. In particular, techniques have been illustrated which enable to re-use existing low-cost architectures and wiring according to various reference implementations that comprise mechanical relays and electrical fuses (cf. FIG. 1). The techniques as illustrated above are suited to be retrofitted into such architectures of existing reference implementations; e.g., it may be possible to simply replace a single mechanical relay by a corresponding SSR. Further, it is possible to employ SSR's that do not comprise overcurrent protection circuitry; this becomes possible by reusing existing electrical fuses. A particular space-saving implementation of the techniques explained herein becomes possible when existing installation space in either a housing of the PTC heating element and/or a housing of a connector establishing an electrical coupling between the supply line and the PTC heating element is used for provisioning the SSR. Furthermore, the techniques explained herein allow to implement a continuously adjustable total heating power in a cost-efficient manner; this is because only a single SSR is required and further switches may be implemented based on conventional low-cost mechanical relays. At the same time, full control over a linearly adjustable total heating power can be achieved by provisioning a single SSR that can be controlled by a PWM control signal; the conventional mechanical relays can be statically or slowly switched and provide a baseline heating power. The techniques explained herein allow for a high flexibility in integration of the SSR; in particular, the SSR can be positioned in the fuse box (cf. FIG. 4), can be provided as a dedicated device (cf. FIG. 5), can be positioned in a housing of the connector towards the PTC heating element (cf. FIG. 6), or can be integrated within the housing of the PTC heating element (cf. FIG. 7). Control of the SSR is possible based on a single-conductor wiring of the control interface based on the PWM control signal. Voltage control and/or current control is possible. Depending on the kind of input signal, it is possible that the control device does not require a processor; then, implementation of the control device can be comparably cost-efficient and space-saving.

According to a 1st example, a circuit is provided. The circuit comprises a mechanical relay. The mechanical relay is configured to switch a first supply current of a first heating element on a first supply line. The circuit further comprises a solid-state relay configured to switch a second supply current of a second heating element on a second supply line.

According to a 2nd example, the circuit of example 1 further comprises a connector configured to establish an electrical coupling between the second supply line and the second heating element. The connector comprises an electrical contact, a housing, and an engagement element. The engagement element is configured to releasably attach the housing of the connector to the second heating element such that the electrical contact can engage with a counterpart electrical contact of the second heating element. The solid-state relay is arranged within the housing of the contact.

According to a 3rd example, in the circuit according to example 2, a largest outer dimension of the housing of the connector is smaller than 10 cm, preferably smaller than 8 cm, more preferably smaller than 5 cm.

According to a 4th example, the circuit of any one of examples 1-3 further comprises a fuse box. The fuse box comprises a housing, a first electrical fuse electrically coupled in series with the mechanical relay on the first supply line, and a second electrical fuses electrically coupled in series with the solid-state relay on the second supply line. The first electrical fuse and the second electrical fuse are arranged inside the housing of the fuse box.

According to a 5th example, in the circuit of example 4, the mechanical relay is arranged inside the housing of the fuse box and the solid-state relay is arranged inside the housing of the fuse box.

According to a 6th example, in the circuit of example 4, the mechanical relay is arranged inside the housing of the fuse box, and the solid-state relay is arranged outside the housing of the fuse box.

According to a 7th example, the circuit of any one of examples 1-6 further comprises a control interface. The control interface is configured to provide a first control signal to the mechanical relay and a second control signal to the solid-state relay. The mechanical relay is configured to either switch on or switch off the first supply current depending on the first control signal. The solid-state relay is configured to alternately switch on and off the second supply current depending on the second control signal.

According to an 8th example, in the circuit of any one of examples 1-7, the solid-state relay does not comprise an overcurrent protection circuitry.

According to a 9th example, in the circuit of any one of examples 1-7, the solid-state relay comprises an overcurrent protection circuitry. The circuit further comprises a fuse box comprising a housing and an electrical fuse electrically coupled in series with the mechanical relay on the first supply line. The electrical fuse is arranged inside the housing of the fuse box.

According to a 10th example, the circuit of any one of examples 1-9 further comprises a control device connected to an input interface and connected to a control interface. The control device is configured to establish, depending on a given input signal received via the input interface, a first control signal prompting the mechanical relay to either switch on or switch off the first supply current on the first supply line. The control device is further configured to establish, depending on the given input signal received via the input interface, a second control signal prompting the solid-state relate to alternately switch on and off the second supply current on the second supply line. The control device is configured to send the first control signal via the control interface to the mechanical relay. The control device is configured to send the second control signal the of the control interface to the solid-state relay.

According to an 11th example, in the circuit of example 10, the control device is further configured to establish a set heating power based on the given input signal. The control device is configured to establish the first control signal depending on a threshold comparison between the set heating power and a predefined threshold. The control device is configured to establish the second control signal depending on a difference between the set heating power and the predefined threshold.

According to a 12th example, in the circuit of examples 10 or 11, the control device further comprises a processor configured to receive the given input signal via the input interface and to process the given input signal. The input signal is a packetized encoded signal indicating the set heating power. The input interface operates according to at least one of the following: controller area network protocol, media oriented system protocol, local interconnect network protocol.

According to a 13th example, in the circuit of any one of the examples 10-12, the input signal is a clocked logic signal indicating the set heating power.

According to a 14th example, in the circuit of any one of the examples 10-13, the second control signal is a pulse-width modulated logic signal.

According to a 15th example, in the circuit of any one of the examples 1-14, the solid-state relay further comprises at least one of a low-pass filter and a high-pass filter.

According to a 16th example, a system is provided. The system comprises a mechanical relay configured to switch a first supply current of the first heating element on a first supply line. The system further comprises a solid-state relay configured to switch a second supply current of a second heating element on a second supply line. The system further comprises the first heating element and the second heating element.

According to a 17th example, in the system of example 16, the second heating element comprises a housing. The solid-state relay and a heating wiring of the second heating element are arranged at least partly inside the housing of the second heating element.

According to an 18th example, in the system of example is 16 or 17, a low-side wiring of the second supply line is twisted around a high-side wiring of the second supply line.

In a 19th example, in the system of any one of examples 16-18, the first heating element comprises a first positive-temperature-coefficient or resistive heating wiring and the second heating element comprises second positive-temperature-coefficient or resistive heating wiring.

In a 20th example, a method is provided. The method comprises sending a first control signal to a mechanical relay. The method further comprises sending a second control signal to a solid-state relay. The first control signal prompts the mechanical relay to either switch on or switch off a first supply current of the first heating element. The second control signal prompts the solid-state relate to alternately switch on and off a second supply current of a second heating element.

Although the invention has been shown and described with respect to certain preferred examples, equivalents and modifications will occur to others skilled in the art upon the reading and understanding of the specification. The present invention includes all such equivalents and modifications and is limited only by the scope of the appended claims.

While reference has been made to PTC heating elements, techniques as disclosed herein may be readily applied to other kinds of heating elements such as resistive wire heating elements.

What is claimed is:

1. A circuit comprising:
    a mechanical relay configured to switch a first supply current of a first heating element on a first supply line;
    a solid-state relay configured to switch a second supply current of a second heating element on a second supply line, the second supply line being different than the first supply line; and
    a control device connected to an input interface and further connected to a control interface, wherein the control device is configured to:
        receive an input signal via the input interface;
        establish, depending on the input signal, a first control signal and a second control signal, wherein the first control signal prompts the mechanical relay to either switch on or switch off the first supply current on the first supply line, and wherein the second control signal prompts the solid-state relay to alternately switch on and off the second supply current on the second supply line;
        send the first control signal via the control interface to the mechanical relay; and
        send the second control signal via the control interface to the solid-state relay.

2. The circuit of claim 1, further comprising a connector configured to establish an electrical coupling between the second supply line and the second heating element, wherein the connector comprises:
    an electrical contact;
    a housing; and
    an engagement element configured to releasably attach the housing of the connector to the second heating element such that the electrical contact can engage with a counterpart electrical contact of the second heating element,
    wherein the solid-state relay is arranged within the housing of the connector.

3. The circuit of claim 2, wherein a largest outer dimension of the housing of the connector is smaller than 10 centimeters (cm), preferably smaller than 8 cm, more preferably smaller than 5 cm.

4. The circuit of claim 1, further comprising a fuse box comprising a housing, a first electrical fuse electrically coupled in series with the mechanical relay on the first supply line, and a second electrical fuse electrically coupled in series with the solid-state relay on the second supply line, wherein the first electrical fuse and the second electrical fuse are arranged inside the housing of the fuse box.

5. The circuit of claim 4,
    wherein the mechanical relay is arranged inside the housing of the fuse box, and
    wherein the solid-state relay is arranged inside the housing of the fuse box.

6. The circuit of claim 4,
    wherein the mechanical relay is arranged inside the housing of the fuse box, and
    wherein the solid-state relay is arranged outside the housing of the fuse box.

7. The circuit of claim 1, further comprising an electrical fuse connected in series with the solid-state relay.

8. The circuit of claim 1,
    wherein the solid-state relay comprises an overcurrent protection circuitry,
    wherein the circuit further comprises a fuse box comprising a housing and an electrical fuse electrically coupled in series with the mechanical relay on the first supply line, and
    wherein the electrical fuse is arranged inside the housing of the fuse box.

9. The circuit of claim 1,
    wherein the control device is configured to establish a set heating power based on the input signal,
    wherein the control device is configured to establish the first control signal depending on a threshold comparison between the set heating power and a predefined threshold, and
    wherein the control device is configured to establish the second control signal depending on a difference between the set heating power and the predefined threshold.

10. The circuit of claim 1,
    wherein the control device further comprises a processor configured to receive the input signal via the input interface and to process the input signal,
    wherein the input signal is a packetized encoded signal indicating a set heating power, and
    wherein the input interface operates according to at least one of the following: Controller Area Network Protocol, Media Oriented System Protocol, Local Interconnect Network Protocol.

11. The circuit of claim 1, wherein the input signal is a clocked logic signal indicating a set heating power.

12. The circuit of claim 1, wherein the second control signal is a pulse-width modulated logic signal.

13. The circuit of claim 1, wherein the solid-state relay further comprises at least one of a low-pass filter and a high-pass filter.

14. A system, comprising:
a mechanical relay configured to switch a first supply current of a first heating element on a first supply line;
a solid-state relay configured to switch a second supply current of a second heating element on a second supply line, the second supply line being different than the first supply line;
the first heating element;
the second heating element; and
a control device connected to an input interface and further connected to a control interface, wherein the control device is configured to:
  receive an input signal via the input interface;
  establish, depending on the input signal, a first control signal and a second control signal, wherein the first control signal prompts the mechanical relay to either switch on or switch off the first supply current on the first supply line, and wherein the second control signal prompts the solid-state relay to alternately switch on and off the second supply current on the second supply line;
  send the first control signal via the control interface to the mechanical relay; and
  send the second control signal via the control interface to the solid-state relay.

15. The system of claim 14,
wherein the second heating element comprises a housing, and
wherein the solid-state relay and heating wiring of the second heating element are arranged at least partly inside the housing of the second heating element.

16. The system of claim 14, wherein a low-side wiring of the second supply line is twisted around a high-side wiring of the second supply line.

17. The system of claim 14,
wherein the first heating element comprises first positive-temperature-coefficient or resistive heating wiring, and
wherein the second heating element comprises second positive-temperature-coefficient or resistive heating wiring.

18. A method, comprising:
receiving by a control device connected to an input interface and further connected to a control interface, an input signal via the input interface;
establishing, by the control device and depending on the input signal, a first control signal and a second control signal;
  sending, by the control signal, the first control signal via the control interface to a mechanical relay; and
  sending, by the control device, the second control signal via the control interface to a solid-state relay,
the first control signal prompting the mechanical relay to either switch on or switch off a first supply current of a first heating element on a first supply, and
the second control signal prompting the solid-state relay to alternately switch on and off a second supply current of a second heating element on a first supply line, the second supply line being different than the first supply line.

19. The method of claim 18, wherein establishing the first control signal and the second control signal comprises:
establishing a set heating power based on the input signal;
establishing the first control signal depending on a threshold comparison between the set heating power and a predefined threshold; and
establishing the second control signal depending on a difference between the set heating power and the predefined threshold.

20. The system of claim 14,
wherein the control device is configured to establish a set heating power based on the input signal,
wherein the control device is configured to establish the first control signal depending on a threshold comparison between the set heating power and a predefined threshold, and
wherein the control device is configured to establish the second control signal depending on a difference between the set heating power and the predefined threshold.

* * * * *